Dec. 2, 1952 R. R. GORDON 2,619,995
ROTARY SAW APPARATUS HAVING ADJUSTABLE SAW GUIDE
Filed May 10, 1948 2 SHEETS—SHEET 1
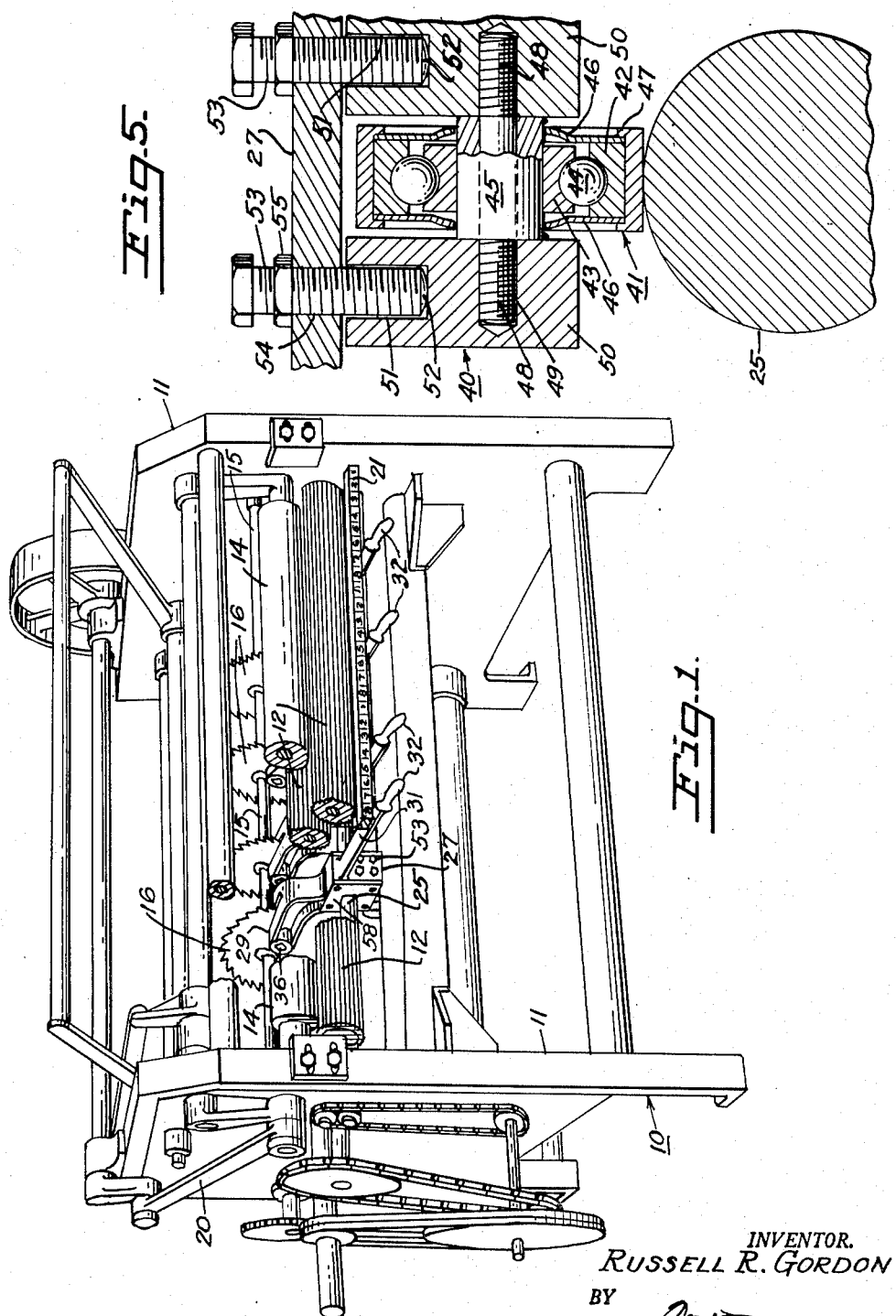
INVENTOR.
RUSSELL R. GORDON
BY
ATTORNEY

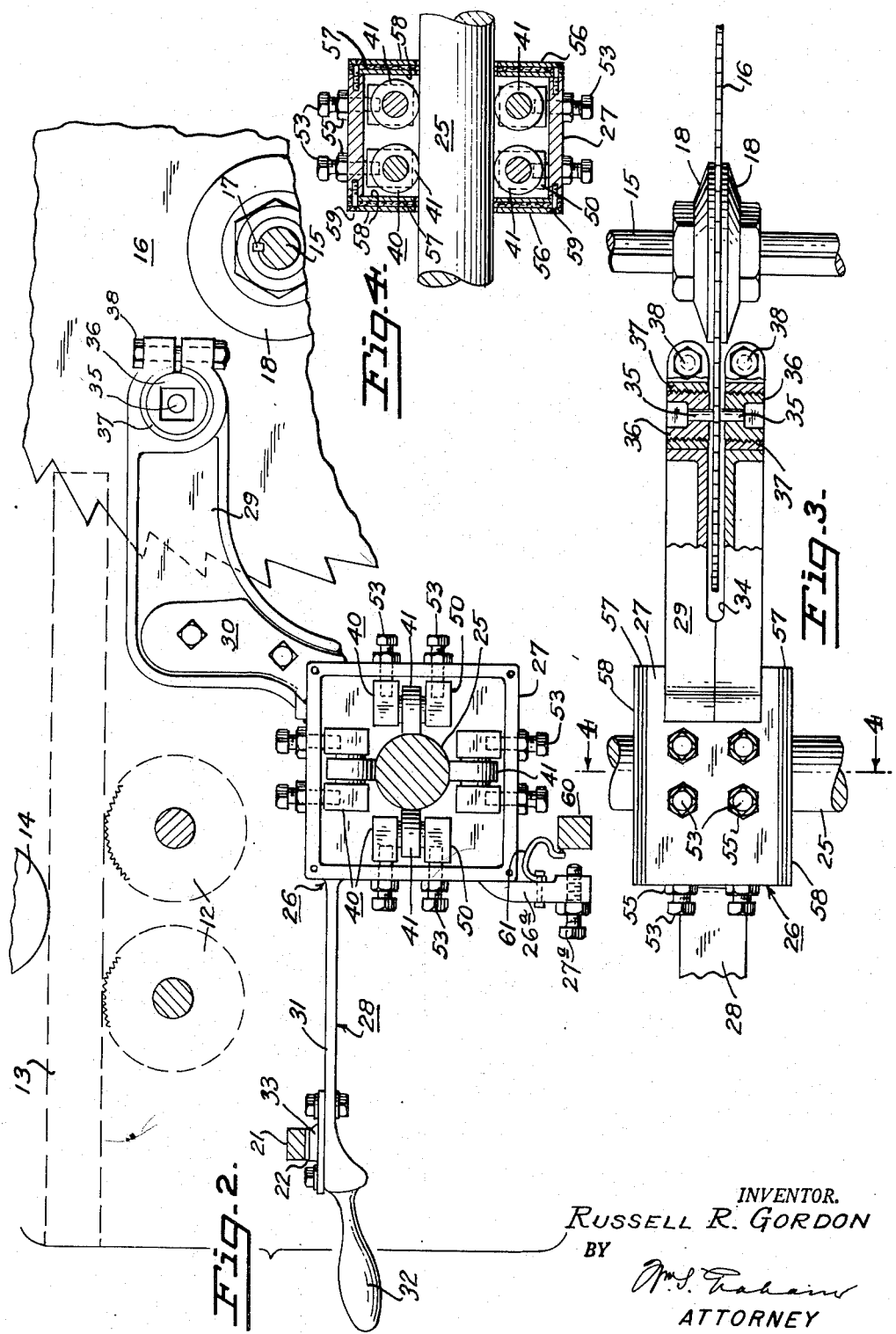

Patented Dec. 2, 1952

2,619,995

UNITED STATES PATENT OFFICE 2,619,995

ROTARY SAW APPARATUS HAVING ADJUSTABLE SAW GUIDE

Russell R. Gordon, Oakland, Calif.

Application May 10, 1948, Serial No. 26,136

2 Claims. (Cl. 143—37)

This invention relates broadly to improvements in lumber sawing apparatus having sliding saw guides, for use in lumber mill equipment such as edgers and the like. More particularly, the invention relates to improvements in saw guides slidable upon a bar upon antifriction bearings for adjusting rotary saws upon an arbor in lumber machinery.

Heretofore there have been sliding saw guides for lumber sawing apparatus, such as edges and the like, but much difficulty has been encountered in the known devices for longitudinally adjusting rotary saws upon a saw arbor in such a sawing apparatus, due to the fact that the saw yoke and lever assembly for sliding the saws has been heretofore mounted for longitudinal adjustment by frictional bearings on a rotating yoke shaft, usually by bronze bushings. Due to the frictional bearing and the fact that much sawdust containing fresh resin necessarily would fall upon and adhere to the shaft, it has been very difficult to slide such a saw yoke. It has, therefore, been necessary to resort to a rotating shaft on which to mount the hub of the saw yoke assembly, so that the rotation of the shaft would, in connection with the longitudinal pressure of the handle of the lever and the friction of the hub on the shaft, serve in the nature of a simulated helical thread to assist in moving the hub of the lever and yoke longitudinally of the shaft. Many difficulties of operation are thus encountered; the lever is difficult to move, the rotation of the shaft wears the hub bushing so that the hub loses a firmly fixed exact positioning on the hub shaft, and the inaccuracy due to this wear is magnified at the saw guide or yoke arm in proportion to the radius or length of the yoke arm from the hub mounting shaft to the rotary saw blades, resultinng in whip or vibration of the saw blades and variation of the saw cuts; to readjust or repair a worn hub bushing, particularly if it is a central one in a series, operation of the entire apparatus must be halted for replacement of the worn hub bushing; if one of the yoke arms requires adjustment or renewal or if the saw-contact pins in any of the yoke arms requires adjustment, particularly if the yoke arm be central in a series, the operation of the entire apparatus must be halted for such repair. It is the purpose of this invention to overcome these and other difficulties in adjustment, repair, or renewal of parts of adjustable yokes for rotary saws.

Therefore, among the objects of the invention are to provide in a sawing apparatus, a longitudinal slidable antifriction bearing for a lever hub for adjusting a rotary saw.

Another object is to provide an improved yoke and lever for longitudinally adjusting a rotary saw on a saw arbor.

A further object is to provide a removable and replaceable yoke arm for straddling a rotary saw blade.

Still further objects are to provide a slidable bearing for saw adjusting lever and yoke readily slidable on a fixed shaft in lumber sawing apparatus and eliminate wear in such a bearing, to shield such a bearing from accumulation of sawdust and resin, and generally to improve upon apparatus for shifting saws upon a saw arbor.

With the foregoing and other objects in view, which will be apparent from or otherwise set forth in this specification, one form in which the invention may be embodied is described herein and illustrated in the accompanying drawing, it being understood that variation of minor details may be resorted to without departing from the spirit of the invention which is defined in the appended claims.

In the accompanying drawings:

Fig. 1 is a front perspective of a sawing apparatus partly broken away, showing the adaptability of the invention in such an apparatus, an edger machine being illustrated by way of example.

Fig. 2 is an enlarged side view, partly in lateral transverse vertical section, of a saw yoke and bearing with saw and lumber feed shown fragmentarily.

Fig. 3 is a fragmentary plan view of the structure of Fig. 2.

Fig. 4 is a fragmentary longitudinal vertical section on line 4—4 of Fig. 3.

Fig. 5 (Sheet 1) is a fragmentary enlarged detail of bearing structure in lateral transverse vertical section.

Referring to the drawings, in which like reference characters indicate corresponding parts in the several views, 10 indicates generally any suitable apparatus in which it is desirable to adjust rotary saws longitudinally upon a saw arbor, illustrated in the present embodiment in respect of a lumber mill edger of a suitable type, it being understood that the invention is not limited to any particular type or character of sawing apparatus, but may be employed in any sawing apparatus having rotary saws longitudinally adjustable upon a saw arbor. For that reason the edger is described in a general way only, 11 indicating a pair of relatively spaced end supports between which are mounted suitable rollers for conveying lumber therethrough, including, among others, a pair of relatively parallel corrugated propelling rollers 12 upon which the lumber 13 or boards to be sawed ride and are propelled to the saw blades. A pressure roller 14 parallels the conveying rollers and maintains and stabilizes the lumber upon the propelling rollers as the lumber moves to the saws. There may be and usually are similar rollers or at least some similar rollers at both front and rear of the apparatus, but for purposes of the invention it is necessary to describe only those which are a major factor in delivery of lumber to a bank of rotary saw blades adjustable on an arbor.

Between the end supports is mounted a saw arbor 15 upon which one or more rotary saws 16 are mounted for rotation thereby, being keyed to the arbor as at 17 for longitudinal sliding thereon. The saw blades are preferably mounted between central reinforcing plates 18. Suitable drive means 19 are provided for the several rotatable rollers, and levers 20 are also employed to vary the position of the rollers for their usual operative purpose.

Saw positioning means are provided, comprising a calibrated notch bar 21 extending longitudinally along the front of the apparatus having characters visible thereon as a guide to indicate saw positions so that widths between sawcuts may be visibly indicated at the front of the apparatus, each calibration of the notch bar having a corresponding notch 22. While the notch bar is mechanically spaced from the saws, it is nevertheless the ultimate saw-positioning means, though operative on the saw blades for that purpose through other mechanical elements to be further described.

Since the lumber must as a practical matter be varied in width as desired, means are provided for adjustably moving the saw blades upon the arbor 15. The saw adjustment means comprises a hub or collar supporting shaft 25 longitudinally transverse of the apparatus between the end supports 11 and preferably below the propelling feed rollers 12. In the present invention the hub supporting shaft may be fixed with relation to the end supports, whereas in previous devices of this character the supporting shaft must for practical purposes, be rotatable for reasons hereinabove stated, and, therefore, must be cylindrical, whereas if desired in the present invention, the hub supporting shaft may be rectangular, hexagonal or other shape in lateral transverse section, being illustrated as cylindrical herein as a preference.

Longitudinally slidable upon the hub shaft are one or more saw yoke arm and lever structures, generally indicated 26, one such structure being to longitudinally adjust each rotary saw blade, and being referred to inclusively as the yoke structure.

Since the yoke structure is for the purpose of longitudinally adjusting the saws on the arbor, it is provided with a tubular hub by which it may be moved longitudinally on the yoke supporting shaft 25. The yoke structure may be segregated into three principal sections, a tubular hub housing or collar 27 of a substantial width axially of the shaft 25, to hold longitudinally aligned bearings; a lever bar 28 extending from one face thereof to releasably engage the saw-positioning notch bar 21, and a bifurcated or slotted saw yoke arm 29 extending from the opposite face thereof and removably secured thereto by bracket 30, and, incidentally, a depending stop arm 26a having a regulating set screw 27a.

The lever comprises a suitably extended bar 31 at the free terminal end of which is a handgrip 32, and spaced adjacently inwardly from the handgrip is a tooth 33 for engaging in the respective notches 22 of the notch bar.

The yoke arm 29 extending oppositely from the hub is an angular member in a vertical plane, one leg of which is releasably connected to the hub housing 27 by the supporting bracket 30, and the other angularly disposed leg of which underlies the horizontal plane of the lumber fed to the saws upon the feed rollers 12, the latter leg being centrally bifurcated to provide a slot 34 of a depth and width to freely receive therein the circumferential toothed edge portion of the rotary saw 16. Adjacent the slotted end, the yoke arm has means to align the saw blades centrally of the slot and to prevent quiver of the blade in cutting lumber, since it will be realized that the stress is very great upon a rapidly rotating saw having a substantial part of the outer diameter of the blade necessarily unsupported so that it may saw relatively thick lumber. Such means is well known and may briefly be described as wooden pins 35 preferably of an oily wood commonly termed lignum vitae mounted in bronze bushings 36, the latter being threadedly mounted for adjustability in collars 37 which are clamped by bolts 38 through the split end of the yoke arm.

The hub 26 of the yoke structure is the important feature of this invention. Since in this invention the shaft 25 upon which the hub rides does not rotate, it may be of any suitable shape in lateral transverse vertical section, but preferably is circular indicating a cylindrical shaft. The hub housing 27 also may be of any suitable shape in a lateral vertical plane to mount thereon the lever 31 and the saw yoke arm 29 and to enclose the shaft 25 and bearing members to be described. But for convenience in mounting the bearing and economy of manufacture, it is preferred that the housing be substantially a hollow square in such transverse vertical plane, as shown in Fig. 2.

Within the hub housing are a plurality of antifriction bearing units 40 mounted in pairs, the pairs being preferably disposed relatively spaced at 90 degrees circumferentially of the shaft 25. In the present exemplification a preferred number of four pairs of such antifriction bearings are illustrated, though three pairs relatively spaced at 120 degrees or a greater number relatively spaced proportionally would be practical. Each pair of antifriction bearings comprises two or more spaced rollers 41 in alignment relative to the shaft axis, forming in effect a truck with one roller on each side of a longitudinal center line of lever 31. The rollers are ball bearings in which the outer race is indicated 42, the inner race 43 and the balls 44 therebetween, the bearing having a hub bushing 45.

Circumferential of the bearing hub bushing 45 are discs 46 on opposite sides of the bearing races and closely fitting around the bearing hub bushing so that the bearing may be packed with lubricant and to exclude sawdust and resin or other foreign matter from the ball bearings; the outer circumference of the disc being held snugly by an annular inturned flange 47 of the roller. Obviously the antifriction bearings may be of the roller bearing type instead of the ball bearing type, since either are available as standard well-known commercial devices.

Novel means are provided for mounting the roller within the yoke hub housing 27. The hub bushing 45 of the bearing is mounted tightly upon an axle 48, the opposite ends of the axle being mounted as by threads 49 in elongated relatively spaced bearing blocks 50, which may be threadly tightened upon the bearing hub. If desired, however, one end of the axle may be integral with one of the bearing blocks and the roller slid tightly upon the axle from the opposite threaded end, whereupon the second bearing block may be threadedly connected. Each roller with its axle and bearing blocks is therefore a unit independent of the other roller members.

Each bearing block 50 is provided at one peripheral end wall with a recess 51 for freely rotatably receiving therein an end 52 of a set screw 53, one for each bearing block, so that each roller unit is mountable, removable, and adjustable in contact with the shaft independently of other roller units. The set screws 53 are threadedly secured by threads 54 through the hub housing wall, the lock nuts 55 serving to lock the set screws at a set position. By adjustment of the set screws the bearing roller 41 may be adjusted into any desired pressure contact with shaft 25.

The antifriction bearing units being thus assembled, are mounted within the housing 27 by loosening the set screws 53 from their threaded seats in the housing wall and withdrawing the free end thereof sufficiently to insert the bearing block and the antifriction bearing assembly between the inner wall of the housing and the shaft 25, inserting the free end of the set screws in the recesses and tightening the set screws until the free ends thereof, contacting the bottoms of the recesses 51, press the circumference of the rollers into tight rolling contact with shaft 25. This operation applied to each of the axially aligned rollers in each pair thereof which are disposed circumferentially spaced around the shaft provides a yoke hub bearing stayed against torque movement on the shaft and provides the intended longitudinal antifriction movement axially upon the shaft.

In the event a roller, ball race, axle or other part of any of the rollers or bearings of any unit become worn, broken, or otherwise damaged, it is only necessary to reverse the steps of installation by removing the set screws of a single bearing unit, remove the particular damaged bearing by sliding the unit from the housing, and sliding another into its place and tightening the set screws, without stopping operation of the apparatus, removing yoke structures from shaft 25, or interfering with any other uninjured bearings or the shaft upon which they move longitudinally.

To further shield the bearing units from sawdust and resin, the opposite open ends of the yoke hub housing 27 may be closed by closure members 56 conforming to the shape of the end of the hub housing, and preferably consisting of a pair of overlying coplanar plates 58 having therebetween a gasket 57 closely contacting the circumference of shaft 25. The end closures are suitably secured to the peripheral edge of the opposite ends of the hub housing, as by screws 59.

The stop arm 26a of the bearing housing serves to delimit the downward movement of the lever assembly 28 to clear the tooth 33 from notch 22 of the calibrated notch bar, and the regulating set screw 27a adjacent its free end may be adjusted to contact a stop bar 60 for regulating the downward movement of the lever assembly, the tilting movement of the hub housing and the bearing unit 40 on shaft 25, and the upward movement of yoke arm 29.

Means are provided for yieldably maintaining the stop arm 26a and regulating pin 27a in spaced relation to the stop bar, since it is at such spaced position of the stop arm that the tooth 33 is engaged in the notch 22 of the notch bar 21, whereby the yoke arm and thereby the saw blade are maintained at a predetermined set position on the saw arbor. As illustrated herein, by way of example, such means may consist of an arcuate leaf spring 61, secured to the stop arm 26a and having its opposite end spring tensioned against the stop bar and adapted to slide therealong in unison with longitudinal movement of the yoke hub housing and lever assembly 28. The tension of spring 61 is such that the tooth 33 is normally maintained at a predetermined set position in a notch of the notch bar, yet permits the lever assembly 28 to be depressed sufficiently to release the notch from the notch bar and to the extent regulated by contact of regulating pin 27a against the stop bar 60. Obviously, when the hand grip 32 and tooth 33 are moved to the predetermined notch 22, the purpose of the tension spring 61 is to maintain the tooth in the notch and thus fix the position of a saw on the saw arbor.

In operation, the yoke, lever and bearing assembly being mounted on fixed shaft 25 with the slot 34, of the yoke arm straddling the saw blade, in order to adjust the saws to predetermined positions on the saw arbor, the handle 32 of lever 28 is depressed against the tension of spring 61 to remove the tooth 33 from the notch 22, the regulating set screw 27a of the stop arm 26a being set to delimit movement of the lever, whereupon the yoke structure and saw may be moved manually without appreciable resistance longitudinally of the fixed shaft 25 due to antifriction bearings which are maintained free of accumulated sawdust and resin. Upon making the desired longitudinal adjustment, the tooth of the lever is set in the predetermined notch and held therein responsive to the tension of spring 61.

If it is desired to renew the saw guide pins 35 or otherwise repair or replace the yoke arm, this may be readily accomplished by removal of the yoke arm and its mounting bracket 30 without interfering with the hub housing and the antifriction bearings therein.

It is to be assumed that in operation the various rollers for moving lumber to and from the saw and other well-known necessary mechanisms of a sawing device are suitably operated for their intended purpose of bringing lumber to the saw and removing the sawed pieces therefrom.

Having described the invention, I claim:

1. In a lumber sawing apparatus having conveyor rollers for feeding lumber to a rotary saw and a rotatable saw arbor having disc saws mounted axially adjustably thereon for rotation therewith, the improvement comprising a saw positioning means having stops thereon for releasably maintaining the saws at a predetermined position on the arbor, means for longitudinally adjusting a rotary saw upon the saw arbor including a fixed shaft relatively paralleling the saw arbor, a hub including a closed bearing housing axially movable on said shaft, a plurality of pairs of antifriction roller bearings within the housing and having bearing on said shaft in relatively circumferential spaced relation, each of said pairs comprising bearing members relatively spaced longitudinally relative to the axis of said shaft, means for mounting the bearing members independently relatively, a handle lever and a saw yoke arm respectively oppositely extended from said housing, the lever being adapted for releasably engaging stops on the saw positioning means and the saw yoke arm being mounted on the housing and straddling one of the saw blades, said independent bearing mountings each comprising a pair of relatively spaced bearing blocks connected by an axle for the roller bearing, each block having a recess in a peripheral side wall thereof, and set screws extending through the hub housing and entering into said recesses.

2. In lumber sawing apparatus, a saw adjusting assembly comprising a tubular hub adapted for slidable mounting circumferentially of a shaft, said hub providing a closed tubular housing having removable opposite end walls through which the shaft extends, a gasket mounted at each end wall of the housing, the gasket having an opening circumferential of and in wiping contact with the shaft, a plurality of pairs of antifriction bearings within the housing and adapted for bearing on the shaft extending through the housing, said pairs of bearings being mounted in relatively circumferentially spaced relation, each of said pairs having antifriction roller members relatively spaced in alignment longitudinally of the axis of the housing, bearing blocks in the housing for supporting the antifriction bearing members, said bearing blocks being recessed at the end thereof adjacent the housing wall, adjustable set screws adjustably mounted through the housing wall and having ends freely rotatable in the recesses of the bearing blocks for pressing the antifriction bearings into contact upon the shaft, said hub assembly having a handle lever and a saw yoke arm respectively oppositely extended therefrom, the lever being adapted for releasably engaging a saw positioning stop means, and the saw yoke arm being adapted for straddling a rotary saw blade.

RUSSELL R. GORDON.

REFERENCES CITED

The following references are of record in the file of this patent:

UNITED STATES PATENTS

| Number | Name | Date |
|---|---|---|
| 206,648 | Tucker | July 30, 1878 |
| 289,819 | Erb | Dec. 11, 1883 |
| 431,483 | Roe | July 1, 1890 |
| 626,431 | Kenfield | June 6, 1899 |
| 879,923 | Stoddard | Feb. 25, 1908 |
| 941,751 | Anderson | Nov. 30, 1909 |
| 991,730 | Lueth et al. | May 9, 1911 |
| 1,094,972 | Borcorselski | Apr. 28, 1914 |
| 1,228,312 | Garnier | May 29, 1917 |
| 1,256,748 | Von Post | Feb. 19, 1918 |
| 1,852,387 | Wieden | Apr. 5, 1932 |
| 2,337,854 | Price | Dec. 28, 1943 |
| 2,349,957 | Greve | May 30, 1944 |